Oct. 7, 1924.

H. PETERSEN

CULTIVATOR

Filed June 20, 1921.   2 Sheets—Sheet 1

Inventor

Henry Petersen

By E. M. Bond

Attorney

Oct. 7, 1924.
H. PETERSEN
CULTIVATOR
Filed June 20, 1921      2 Sheets-Sheet 2
1,510,524
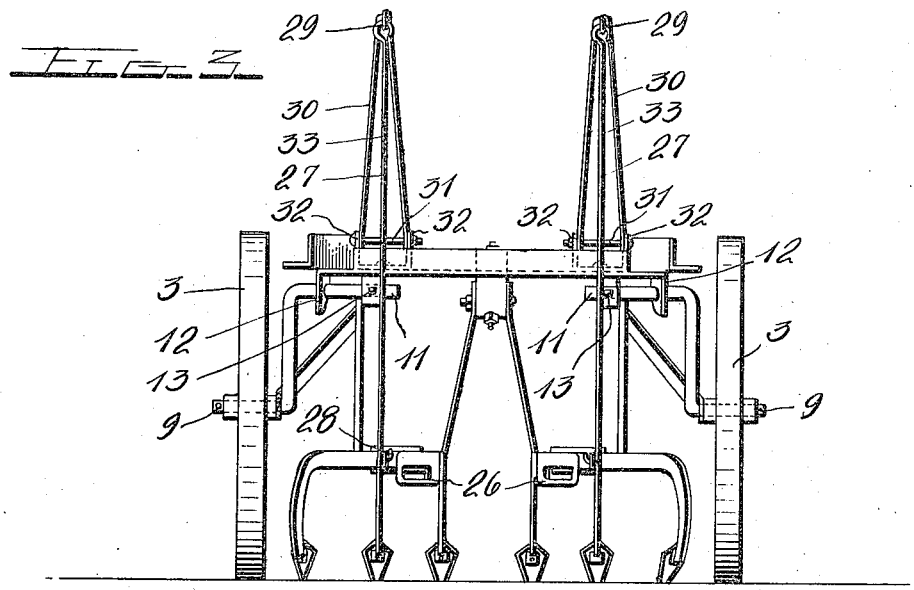
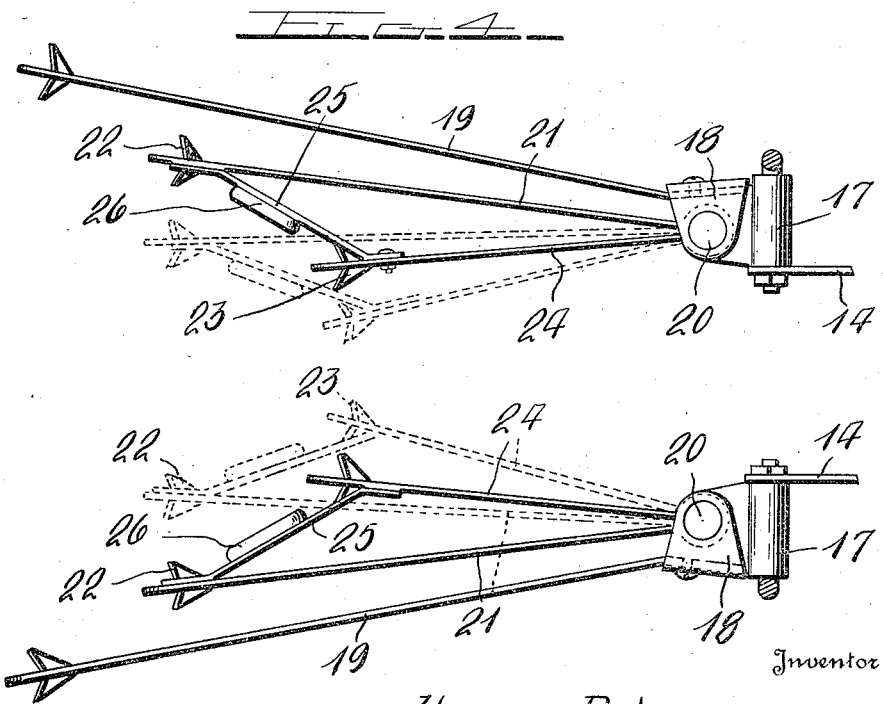
Inventor
Henry Petersen
By E. H. Bond
Attorney Patented Oct. 7, 1924.

1,510,524

UNITED STATES PATENT OFFICE.

HENRY PETERSEN, OF MOUNT AUBURN, IOWA.

CULTIVATOR.

Application filed June 20, 1921. Serial No. 478,825.

*To all whom it may concern:*

Be it known that I, HENRY PETERSEN, a citizen of the United States, residing at Mount Auburn, in the county of Benton and State of Iowa, have invented certain new and useful Improvements in Cultivators, of which the following is a specification.

This invention relates to cultivators and more particularly to that class of cultivators known as "straddle-row" cultivators, and it has for its object among others to provide a simple, yet efficient construction wherein the outer member or portion of the gang is relatively fixed against lateral movement while the other member or members are capable of lateral movement with relation thereto. By this means the carrying wheels are permitted to travel nearer the adjoining earth-engaging members and thus the carrying wheels are prevented from traveling on narrow adjoining rows, or leaning plants from the adjoining rows. Furthermore, but little labor is required to manipulate the gangs compared with the labor required where all the members have to be moved. The exertion is so small and the strain so little on the cultivator that the other parts that are not moved horizontally serve to steady the cultivator and the latter moves more smoothly and side swinging on the animal's neck is prevented.

The said relatively fixed member or members and the laterally movable member or members are so mounted that they are movable vertically in unison and can be readily thrown up out of operative position and there retained without any securing means. The gangs are easily moved by the feet of the driver so that the hands are free to manipulate the reins at all times. The outside members and beams may be removed and the wheels set closer together, for truck and gardening, thereby making a compact and perfectly complete implement.

Another object is to provide a cultivator which is simple in construction and may be quickly and compactly folded for shipment or storage.

Other objects and advantages of the invention will hereinafter appear and the novel features thereof will be specifically defined by the appended claims.

The invention, in its preferred form, is clearly illustrated in the accompanying drawings, which, with the numerals of reference marked thereon, form a part of this specification, and in which—

Figure 3 is a rear elevation.

Figure 4 is a longitudinal section, as on the line 4—4 of Figure 1, looking down.

Like numerals of reference indicate like parts throughout the several views.

Figure 1:
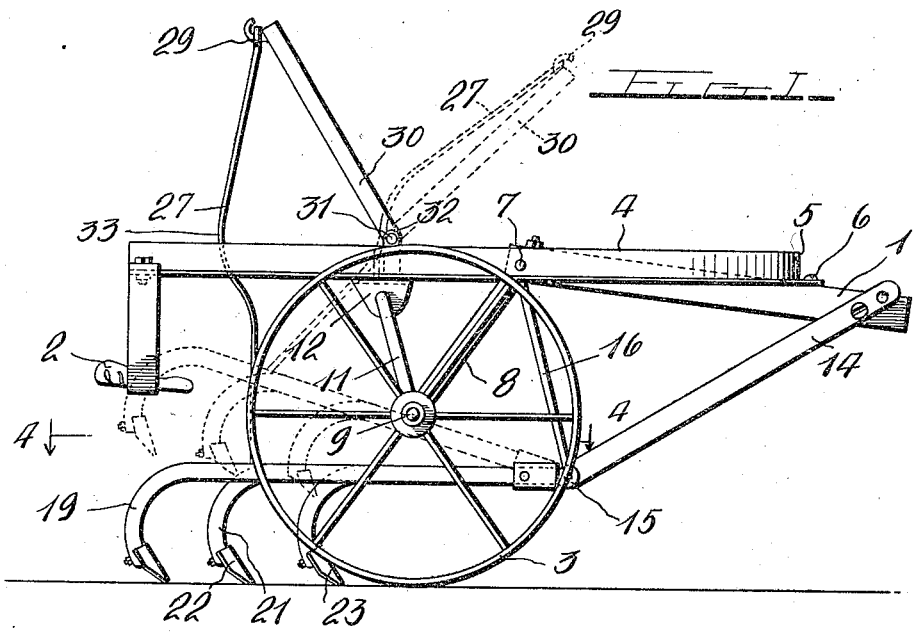
Figure 1 is a side elevation of a cultivator constructed in accordance with my present invention.
Figure 2:
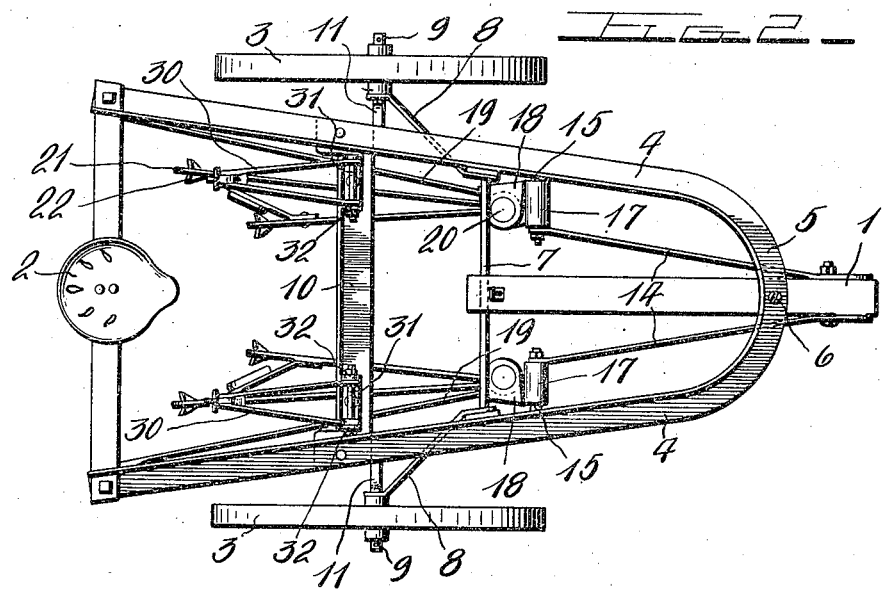
Figure 2 is a top plan thereof.

Referring to the drawings, 1 designates the tongue, 2 the seat, 3 the ground wheels, and 4 the frame, formed preferably of angle iron and bent into the curved form 5 at the front, as seen best in Figure 2, although this form is not necessarily employed. The front portion of the frame is secured to the tongue, as at 6, see Figures 1 and 2. 7 is a cross brace rod to which the rear end of the draft tongue 1 is secured in any suitable manner. 8 are inclined brace rods connected at one end to the side beams or portions of the frame adjacent the ends of the brace rod 7 and extended rearward have their rear ends sleeved upon the inner ends of the spindles 9. The spindles 9 are carried by the arched axle which in this instance is secured to the under side of the transverse member 10. This arched axle may be of any of the well-known forms adapted for the purpose, but in this instance is shown as of that type in which the spindles may be adjusted to and from each other as occasion may require, to bring the ground wheels nearer together or farther apart. In this instance the two stub axles 11 are mounted in suitable bearings in the hangers 12 supported from the cross member and are held in their adjusted positions by suitable means, as the set screw or the like 13, seen clearly in Figure 3.

14 are bars having their forward ends secured to opposite sides of the draft tongue 1, as seen clearly in Figure 2, while their rear ends are sleeved upon the inner ends of the stub axles 15, see Figure 2, which extend inward from the lower ends of the depending members 16 which may or may not be integral with the cross rod 7, but in any event are fixedly supported in a substantially vertical position from a point adjacent the inner end of the draft tongue. These members 16 may incline slightly forward, as seen in Figure 1, if preferred.

Sleeved upon the stub axles 15 so as to turn readily thereon, are the sleeves 17, see Figure 2, and also Figure 4, and extended rearward from these sleeves and preferably formed integral therewith, as seen, and within the space between the top and bottom portions thereof are fixedly secured the forward ends of the cultivator beams 19, as seen best in Figure 4, while supported in each of these flanges is a vertical pin or the like 20, upon each of which is mounted for free pivotal movement a cultivator beam 21 which may carry one or more earth-engaging members 22. In the present instance, I have chosen to show two of these, one carried by the beam 21 and the other, 23, carried by a supplemental beam 24 extending at an angle to the beam 21, as shown clearly in Figure 4. 25 is a bar or the like disposed at an angle to the length of the cultivator beams 21 and 24, as seen in Figure 4, and connected to the same near their outer ends and this bar 25 is provided with a foothold 26 into which the foot of the driver may be placed to swing the beams 21 and 24 laterally when desired.

It is to be understood that the beam 19 is rigid and has no lateral movement, while the beams 21 and 24 are mounted to swing laterally with reference thereto. But the beams 19 and 21 and 24 are mounted to have freedom of movement together vertically by reason of their being mounted to turn upon the stub axles 15, as above explained.

While the beams at each side of the cultivator may be moved upon their pivots upward in many ways, I have chosen to show, in the present instance one form which will be found efficient. 27 is a rod, one for each set of beams, attached at one end in any suitable manner, as by interengaging eyes or the like 28, to the beam 21 and at the upper end by similar or suitable means 29, to the rear end of a link or the like 30 which may be of the two-armed type, as seen in Figures 2 and 3, or otherwise, and this, in turn, is pivotally mounted on a suitable pin or the like 31 mounted in ears 32 rising from the cross member 10, as seen clearly in Figures 1 and 2.

Figure 1 shows the parts in the position they assume in use. The driver sits on the seat and with his feet he may easily swing the beams 21 and 24 inward or outward, as circumstances may require, to clear the plants, the outer beams 19 remaining in their fixed position, and he does not have to take his hands off of the reins.

When it is desired to raise all the beams from contact with the ground for transportation of the cultivator from place to place, the driver simply pulls upward upon the rods 27, which may be curved to the rear near their upper ends, if desired, as seen at 33, to form hand holds, and pushes forward, and when the link 30 moves beyond the vertical line the parts will be automatically locked against accidental return movement, as will be readily understood.

The laterally movable beams on each side of the cultivator are movable independently of each other, and the sets of beams on either side of the device may be raised independently of each other.

Modifications in detail may be resorted to without departing from the spirit of the invention or sacrificing any of its advantages.

What is claimed as new is:—

1. In a cultivator, a relatively fixed beam and connected laterally swinging beams movable in unison relatively thereto, and a vertical pivot common to said swinging beams and on which they swing laterally of the cultivator said fixed and swinging beams mounted for vertical pivotal movement in unison.

2. In a cultivator, a relatively fixed beam and connected laterally swinging beams movable in unison relatively thereto, a vertical pivot common to all of said swinging beams and on which they swing laterally of the cultivator, and a horizontal bearing forming the support for said fixed beam and said pivot said fixed and swinging beams mounted for vertical pivotal movement in unison.

3. In a cultivator, a relatively fixed beam, and a beam laterally movable with reference thereto, both of said beams being mounted for movement on a horizontal pivot common to both for vertical movement in unison.

4. In a cultivator, a relatively fixed beam, a beam mounted to swing laterally with relation thereto, a fixed member forming the support for all of said beams, and a pivot on which said swinging beam is mounted to swing laterally, and means for swinging all the beams vertically in unison into automatically retained position.

5. In a cultivator, a relatively fixed beam, a beam mounted to swing laterally with relation thereto, a fixed member forming the support for said beams, and a pivot on which said swinging beam is mounted to swing laterally, means for swinging said beams vertically in unison into automatically retained position, said laterally-movable beam comprising a plurality of members connected to move in unison, and a foot hold on the connecting means.

6. In a cultivator, a relatively fixed earth implement carrying beam, laterally swinging beams movable relatively thereto, an angularly disposed member connecting the last named beams to move them in unison, a foot-hold on said member, a vertical pivot for the laterally swinging beams, and a horizontal pivotal support on which all of the said beams are mounted for vertical movement simultaneously.

In testimony whereof I affix my signature.

HENRY PETERSEN.